United States Patent

Parker

[15] 3,638,518

[45] Feb. 1, 1972

[54] STRIPPING MACHINE FOR ELECTRICAL CONDUCTORS

[72] Inventor: Gilbert R. Parker, Lorain, Ohio

[73] Assignee: Lorain Products Corporation

[22] Filed: Aug. 14, 1970

[21] Appl. No.: 63,733

[52] U.S. Cl. ............................................................81/9.51
[51] Int. Cl. .........................................................H02g 1/12
[58] Field of Search ........................................81/9.51, 9.5 A

[56] References Cited

UNITED STATES PATENTS

| | | | |
|---|---|---|---|
| 1,592,592 | 7/1926 | Anderson et al. | 81/9.51 UX |
| 3,002,408 | 10/1961 | Schwalm et al. | 81/9.51 UX |
| 3,154,980 | 11/1964 | Hayden et al. | 81/9.51 |

*Primary Examiner*—Theron E. Condon
*Assistant Examiner*—Roscoe V. Parker, Jr.
*Attorney*—John Howard Smith

[57] ABSTRACT

A machine for stripping the insulation from the end of an electrical conductor. An insulated conductor is placed between first and second cutter blades each having a size and shape suitable for use with the size of conductor being stripped and between first and second gripping jaws. Cam followers are attached to each cutter blade and each gripping jaw. A control member having a tapered end and a cylindrical body is longitudinally driven against the followers. The cutter blades are arranged to travel inwardly to sever an end section of the insulation when the followers associated therewith are in moving contact with the tapered end of the control member and to trap the severed end section of the insulation when the followers are in contact with the cylindrical body of the control member. The gripping jaws are arranged to grip the conductor with increasing pressure when the followers associated therewith are in moving contact with the tapered end of the control member. As the latter followers travel along the taper, the gripping jaws and the conductor held therebetween move with the control member away from the cutter blades to pull the main body of the conductor away from the trapped end section of insulation.

12 Claims, 6 Drawing Figures

INVENTOR.
GILBERT R. PARKER

INVENTOR.
GILBERT R. PARKER

STRIPPING MACHINE FOR ELECTRICAL CONDUCTORS

BACKGROUND OF THE INVENTION

The present invention relates to an apparatus for stripping the insulation from the end of an electrical conductor and is directed more particularly to a device of the above character well adapted to strip insulation from heavy cable.

Prior to the present invention, machines for stripping the insulation from the ends of electrical conductors of large diameter have typically comprised assemblages of tools each having an associated source of motive power. These power sources were utilized at different times during the stripping process to operate the respective tool. Switching devices such as limit switches were provided to insure that each step in the stripping process occurred in the proper sequence. In addition to rendering the initial cost of the machinery too high for many of the usages where the amount of stripping to be done is relatively small, the complexity of this type of wire-stripping machine necessitated careful and sometimes complex adjustments when the gauge of the conductor or the length of insulation to be removed was changed. Additionally, constant adjustment was required even though the same wire size and stripping length was involved.

SUMMARY OF THE INVENTION

Accordingly, it is an object of the invention to provide improved and simplified means for stripping the insulation from the end of an electrical conductor particularly when heavy cable is being processed.

It is another object of the invention to provide a wire-stripping apparatus wherein each step in the stripping process is accomplished directly as a single control member is driven by a single source of motive power.

Another object of the invention is to provide a wire-stripping apparatus so arranged that the adaptation thereof to strip a wide variety of sizes of conductors consists of changing only the size of the blade used to cut the insulation of the conductor.

Still another object of the invention is to provide a wire-stripping apparatus wherein the gripping force exerted on the main body of the conductor during stripping does not exceed a predetermined maximum, this maximum force being sufficiently small to prevent the crushing of the insulation. This is important since that portion of the insulation is not to be stripped and electrical codes almost universally prohibit broken insulation.

More specifically, it is an object of the invention to provide a wire-stripping apparatus including a cutter mechanism, a movable conductor gripping mechanism and a drive member for mechanically controlling the activity of the cutter and gripping mechanisms, wherein the motion of the drive member first forces the cutter mechanism to cut and trap in place the end section of insulation which is to be stripped, and then forces the gripping mechanism to grip the conductor and move the gripped conductor section away from the trapped end section of insulation which is to be stripped from the conductor.

It is another object of the invention to provide a wire-stripping apparatus of the above character wherein the gripping mechanism and the drive member are so arranged that a wide range of sizes of conductors may be stripped without adjusting the drive member or the gripping mechanism.

It is another object of the invention to provide apparatus of the above character where the drive, gripping and cutting activity is controlled by positive cam action, not subject to variation of adjustment, thus reducing toolup time to the mere change of blades and virtually eliminating downtime for correcting out-of-adjustment conditions during normal stripping operation.

DESCRIPTION OF THE DRAWINGS

FIG. 2 is a cross section taken along the line 2—2 of FIG. 1a,

DESCRIPTION OF THE INVENTION

Figure 1:
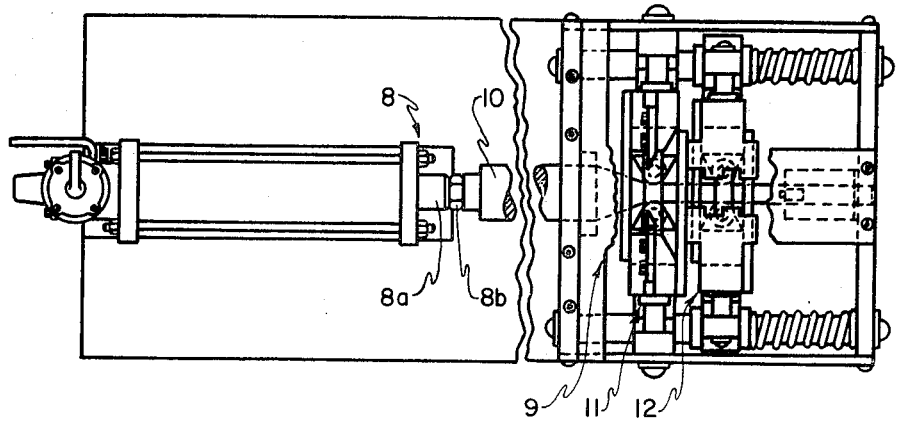
FIG. 1 is a plan view of a wire-stripping machine embodying the invention.

Referring to FIG. 1, there is shown one form of a wire-stripping machine constructed in accordance with the invention. This machine includes a source of motive power 8, which here takes the form of a pneumatic drive mechanism having a longitudinally movable piston 8a, and a stripping mechanism 9. Drive mechanism 8 controls the stripping activity of stripping mechanism 9 in accordance with the longitudinal position of a control member 10 which is rigidly attached to the end of piston 8a by a fastening nut 8b.

Figure 1A:
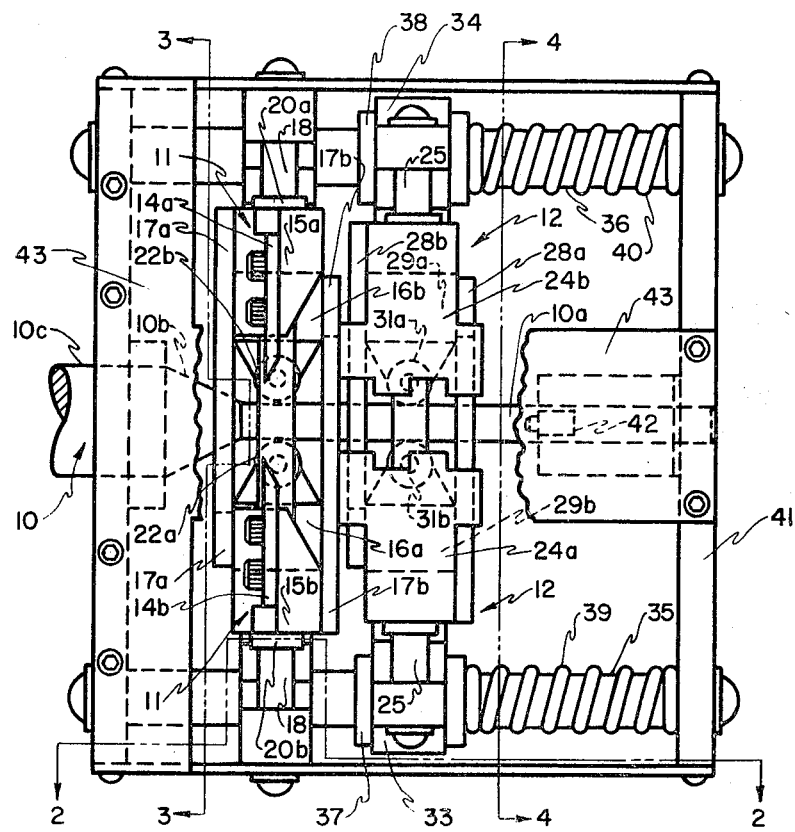
FIG. 1a is a fragmentary view of the operating mechanism.
Figure 2:
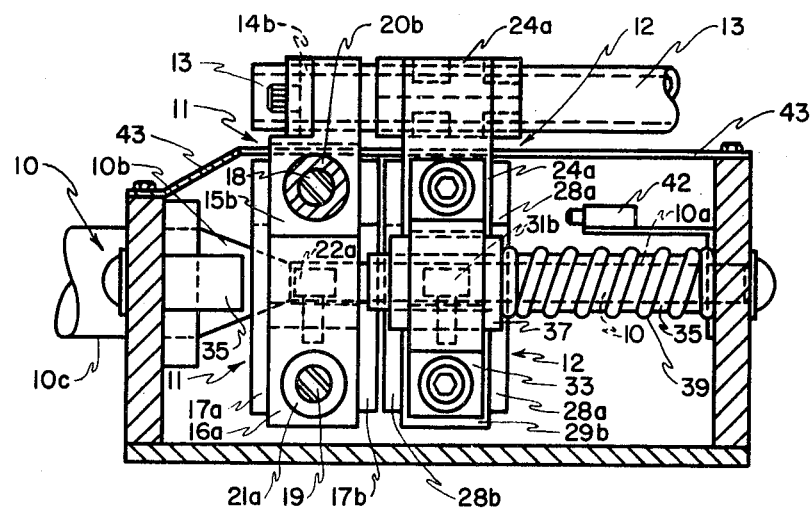

To the end that the longitudinal movement of control member 10 may initiate the desired stripping activity, stripping mechanism 9 includes cutter means 11 and gripping means 12. As will be described more fully presently, cutter means 11 and gripping means 12 include transversely movable cutter and gripper sections, respectively, which move inwardly around a conductor 13 disposed therebetween to cut, grip and strip an end section of insulation therefrom as control member 10 is advanced longitudinally to the right as shown in FIGS. 1, 1a and 2.

Figure 3:
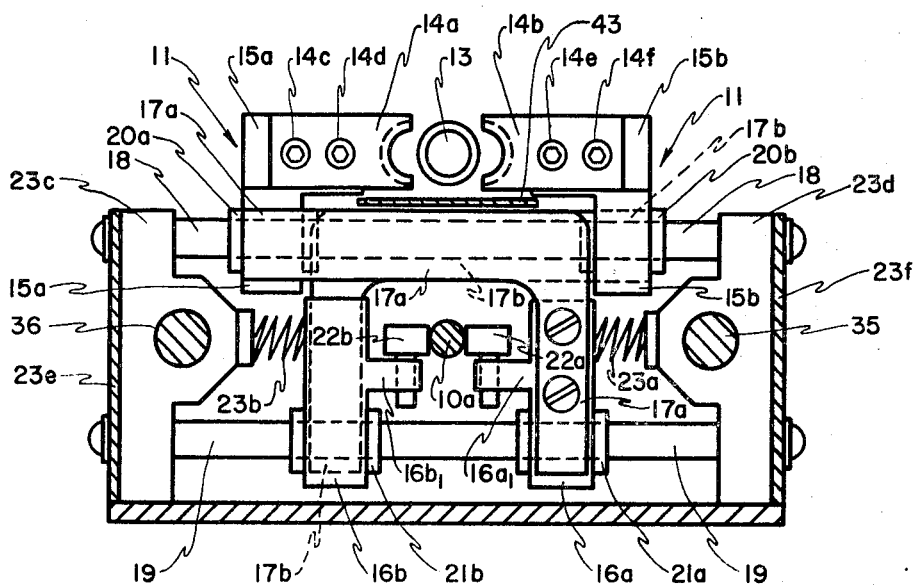
FIG. 3 is a cross section taken along the line 3—3 of FIG. 1a, showing the cutting mechanism of the invention.

As is most clearly seen in FIG. 3, cutter means 11 includes cutter blades 14a and 14b each of which has a sharpened edge of the same general shape as the shape of cross section of the conductor to be stripped, in this case circular. The supporting or bladeholder structure associated with blade 14a includes blocks 15a and 16a which are rigidly joined by a cross member 17a. Similarly, the bladeholder structure associated with blade 14b includes blocks 15b and 16b which are rigidly joined by a crossmember 17b. Cutter blades 14a and 14b are fastened to their respective bladeholders by capscrews 14c and 14d and 14e and 14f, respectively. This allows blades 14a and 14b to be replaced if the gauge of wire being stripped is changed. The above bladeholders are mounted and free to slide inwardly and away from each other on transversely disposed rods 18 and 19 which serve as guides, bushings 20a and 21a, and 20b and 21b being provided to facilitate the latter motion. These guides are attached to mounting blocks 23c and 23d which are, in turn, attached to side plates 23e and 23f, respectively. Thus, in the present embodiment, it will be seen that cutter means 11 includes two distinct and relatively movable cutter sections, mounted on guides 18 and 19, to give the desired insulation cutting activity to be more fully described presently.

To the end that the edges of cutter blades 14a and 14b may be forced against the insulation of conductor 13 when control member 10 is advanced or driven to the right as shown in FIG. 1, there is provided cutter control means which here take the form of cam followers 22a and 22b. These followers are rotatably fixed to mounting bosses $16a_1$ and $16b_1$, respectively, the latter bosses shown herein as being an integral part of blocks 16a and 16b, respectively. Cutter springs 23a and 23b, being fixedly secured to mounting blocks 23d and 23c, respectively, exert inward forces against blocks 16a and 16b, respectively, and thereby keep followers 22a and 22b in contact with control member 10 which acts as a follower control means or cam control surface.

When rotatable followers 22a and 22b are in contact with the cylindrical end section 10a of control member 10, as shown in FIGS. 1a, 2, 3 and 4, cutter means 11 is in its rest or noncutting position with the blades fully separated. As control member 10 is driven longitudinally between followers 22a and 22b, the latter come into contact with a tapered section 10b of control member 10 which serves as the drive section thereof. As this occurs, section 10b acts as a wedge and drives followers 22a and 22b away from one another. This causes blades 14a and 14b to move toward each other and cut the insulation of conductor 13, the latter motion resulting from the crossover configuration of crossmembers 17a and 17b and the resulting spreading action of blocks 16a and 16b. As control member 10 is driven still further between followers 22a and 22b, the latter come into contact with the cylindrical base section 10c of control member 10 which serves as the dwell section thereof. When this occurs, control section 10b no longer acts as a wedge and followers 22a and 22b remain a fixed distance apart due to the cylindrical form of section 10c. Under these conditions, blades 14a and 14b are held in their cutting position, that is, with the edges of blades 14a and 14b embedded into the insulation of conductor 13 to avoid scarring the internal metallic conductor.

In the present embodiment, blades 14a and 14b are selected to have cutting edges so shaped that, for a given gauge of wire to be stripped, substantially the full thickness of the insulation of conductor 13 is cut when blades 14a and 14b stop their inward travel, this inward travel being arranged to stop as followers 22a and 22b come into contact with the base section 10c of control member 10. Thus, an end section of the insulation of conductor 13 will be cut and trapped by blades 14a and 14b as control member 10 is advanced between followers 22a and 22b.

Figures 4, 5:
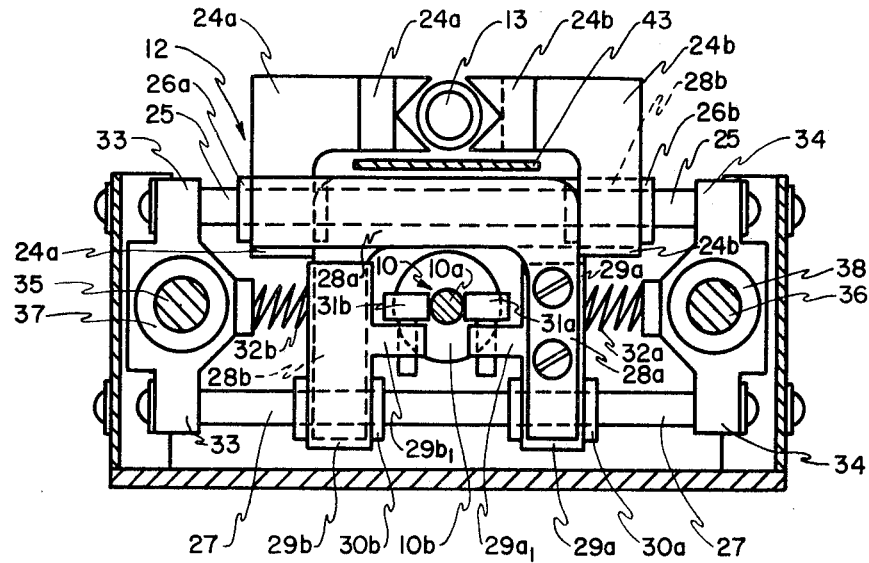
FIG. 4 is a cross section taken along the line 4—4 of FIG. 1a showing the gripping mechanism of my invention.
FIG. 5 is a fragmentary view of FIG. 4 showing one of the operative positions thereof.

To the end that a longitudinal insulation stripping force may be applied to pull the main body of the conductor 13 away from the above-described cut and trapped end section of insulation, there is provided a gripping means 12. As is best shown in FIG. 4, the latter mechanism includes gripping jaws 24a and 24b which are connected to a transversely disposed guide rod 25 by bushings 26a and 26b, respectively, these jaws also being connected to a transversely disposed guide rod 27 through crossmembers 28a and 28b, blocks 29a and 29b, and bushings 30a and 30b, respectively. Thus, gripping means 12 includes two gripper sections, each of which is slidably mounted on guides 25 and 27.

In order that the advance of control member 10 in a direction to the right in FIG. 1 will cause gripping jaws 24a and 24b to travel inwardly and grip conductor 13, there is provided gripper control means which here takes the form of cam followers 31a and 31b. These followers are rotatably fixed to mounting bosses 29a₁ and 29b₁, respectively, the latter bosses shown herein as being an integral part of blocks 29a and 29b, respectively. Followers 31a and 31b are kept in contact with control member 10 by the expansive action of gripper springs 32a and 32b against blocks 29a and 29b, respectively. The strength of these springs determines the maximum gripping force which jaws 24a and 24b can exert upon conductor 13 and thereby prevents the crushing of the insulation which is to remain on conductor 13 after stripping.

When followers 31a and 31b are in contact with the cylindrical end section 10a of control member 10, as shown in FIGS. 1a, 2 and 4, gripping means 12 is in its rest or non-gripping position. As control member 10 is advanced against followers 31a and 31b, however, the latter come into contact with the tapered section 10b of control member 10. As this occurs, the advancing tapered surface acts as a wedge and drives followers 31a and 31b apart. This action, due to the crossover arrangement of the members 28a and 28b, causes gripping jaws 24a and 24b to move toward one another and thus come into contact with conductor 13 to exert an increasing gripping force thereupon.

As will be described more fully presently, as this inward, transverse gripping force exerted by gripping jaws 24a and 24b on conductor 13 increases, gripping means 12 begins to move longitudinally with control member 10 against the expansive force of springs 39 and 40. Under the above conditions, conductor 13 moves with gripping means 12 and control member 10 in a longitudinal direction parallel to the axis of control member 10, while the cut end section of insulation remains trapped beyond cutter blades 14a and 14b to prevent longitudinal movement thereof. This results in the separation of the cut end section of insulation from the main body of conductor 13.

To the end that the above stripping activity may be accomplished, gripping mechanism 12 is mounted on a movable supporting structure including guide mounts 33 and 34. The latter guide mounts are rigidly fixed to transverse guides 25 and 27 and are slidably fixed to longitudinal guides 35 and 36 by bushings 37 and 38, respectively. Thus, while the two sections of gripping means 12 are free to slide transversely with respect to one another on guides 25 and 27, the structure including the two sections of gripping means 12, guides 25 and 27, blocks 33 and 34, and springs 32a and 32b are free to simultaneously slide longitudinally upon guides 35 and 36.

As is most clearly seen in FIGS. 1a and 2, springs 39 and 40 are mounted around longitudinal guides 35 and 36 between an end plate 41 and guide mounts 33 and 34, respectively, of the gripper mechanism. These springs provide the force necessary to restore the gripping mechanism to its rest position when the direction of motion of control member 10 reverses. These springs also resist premature longitudinal motion of the gripper mechanism along guides 35 and 36 as control member 10 is moved in the drive direction against followers 31a and 31b toward the right as seen in FIG. 1a.

This movement of control member 10 in the drive direction generates gripping action when the followers 31a and 31b contact the inclined section 10b and at this time the springs 39 and 40 resist longitudinal movement of the gripping members 12 whereby the followers 31a and 31b may climb the section 10b only partially as limited by the expansive force of springs 32a and 32b. As the latter springs prevent further separation of followers 31a and 31b, this transverse action is converted to longitudinal movement of the entire gripper assembly against the springs 39 and 40.

During the longitudinal movement of the gripper assembly 12 to the right of FIG. 1a, with the main body of the cable now gripped therein, this portion of the cable is moved to the right and the severed portion of the insulation trapped at the left of the blades 14a and 14b is stripped from the conductor portion of the cable.

As indicated above, the foregoing stripping activity occurs while follower means 31a and 31b are still in contact with the tapered section 10b of control member 10. This is because control member 10 would be unable to transmit longitudinal force on gripping means 12 and conductor 13 if followers 31a and 31b should continue to climb the incline or come into contact with the cylindrical base section 10c of control member 10. This fact must be considered in determining the shape and separation of gripping jaws 24a and 24b.

To the end that the above gripping-stripping activity of gripping means 12 may occur in the above-described manner despite changes in the size of conductor being stripped, gripping jaws 24a and 24b are provided with opposed, intermeshing surfaces which allow the jaws to enclose areas of widely varying cross section. Referring to FIG. 1, it will be seen that each of the gripping jaws has a contour including a plurality of adjacent male and female segments, the male and female segments of each gripping jaw being disposed opposite to the respective female and male segments of the other gripping jaw. Referring to FIG. 4, it will be seen that each of the gripping jaws is provided with a substantially right angle longitudinal groove which occupies the entire jaw face.

When the gripping jaws are closing, each male segment of each gripping jaw enters the corresponding female segment of the opposite jaw. As this intermeshing progresses, the substantially square cross-sectional area enclosed by the longitudinal grooves diminishes. This decrease in cross-sectional area may be seen in FIG. 5. It will be understood that while the above activity is occurring, followers 31a and 31b are in contact with the tapered central section 10b of control member 10 and conductor 13 is being exposed to an increasing gripping force. As described previously, as the latter force increases, the gripping mechanism moves longitudinally along guides 35 and 36 and removes the cut end of insulation.

When larger diameter conductors are being stripped, followers 31a and 31b ride only a short distance up the tapered section 10b of control member 10 before gripping jaws 24a and 24b close upon and cause longitudinal displacement of the conductor. When small diameter conductors are being stripped, followers 31a and 31b ride a further distance up the tapered section of control member 10 before the gripping jaws close upon and cause the longitudinal displacement of the conductor. Thus, conductors of different diameters may be gripped and displaced without adjustment of the gripping mechanism.

After the cut end section of insulation has been removed, the stripped conductor may be released by reversing the motion of control member 10. During this reverse motion, springs 39 and 40 restore gripping means 12 to its original or rest position, springs 32a and 32b restore jaws 24a and 24b to their original or open positions and springs 23a and 23b restore cutter blades 14a and 14b to their original or open positions. This reverse motion may be accomplished by the application of manual force (as may the entire stripping process) or may be initiated automatically by a suitably connected limit switch 42.

A top plate 43 may be provided to protect the wire-stripping mechanism from the entry of foreign particles and also to help orient conductor 13 in cutter means 11 and gripping means 12, prior to the movement of control member 10.

In view of the foregoing, it will be seen that a wire-stripping device constructed in accordance with the invention utilizes a single source of motive power to sever an end section of insulation, grip the conductor with a predetermined maximum force, and translate the conductor away from the cut end section of insulation. It will further be seen that a wire-stripping device constructed in accordance with the invention can be adapted to strip electrical conductors having a wide range of diameters by merely changing the blades of the cutter means.

It will be understood that the embodiment shown herein is for explanatory purposes only and may be changed or modified without departing from the spirit and scope of the appended claims.

What is claimed is:

1. In a machine for removing the insulation from the end of an electrical conductor, in combination, follower control means having first and second sections, cutter means having first and second cutter sections, each of said cutter sections including cutter follower means and a cutter blade, gripping means having first and second gripper sections, each of said gripper sections including gripper follower means and a gripping jaw, said gripping means being adapted to move away from said cutter means in a direction parallel to the axis of the conductor in response to a longitudinal force exerted thereon by said follower control means, means for driving said follower control means against said follower means, means for forcing said first and second cutter blades into the insulation of the conductor when said first section of said follower control means is driven against said cutter follower means and for maintaining said cutter blades in their cutting position when said second section of said follower control means is driven against said cutter follower means, means for forcing said first and second gripping jaws against the conductor when said first section of said follower control means is driven against said gripper follower means, the force of said gripping jaws against said conductor being sufficient to allow the conductor to move longitudinally with said gripping means while said gripper follower means is in contact with said first section of said follower control means, means for reversing the direction of movement of said follower control means and means for repositioning said cutter means and said gripping means as said follower control means assumes its initial position.

2. In a machine for removing the insulation from the end of an electrical conductor, in combination, a longitudinally actuatable control member having a first section of nonuniform cross-sectional area and a second section of uniform cross-sectional area, said first section being located at one end of said control member, cutter follower means, gripper follower means, means for driving said control member longitudinally against said follower means, means for cutting an end section of insulation on the conductor when said cutter follower means is in moving contact with said first section of said control member and for holding said cut end section of insulation when said cutter follower means is in contact with said second section of said control member, longitudinally movable means for gripping the conductor with increasing pressure when said gripper follower means is in moving contact with said first section of said control member, said gripper follower means affording increasing resistance to the relative movement of said control member and said gripper follower means as the conductor is gripped with increasing force, means for guiding the longitudinal motion of said gripping means and the conductor gripped therein in the direction of motion of said control member as said resistance increases, means for reversing the direction of movement of said control member and means for repositioning said follower means as said control member assumes its original position.

3. In a machine for removing the insulation from the end of an electrical conductor, in combination, a control member having a first section of one geometrical form and a second section of another geometrical form, means for circumferentially cutting the insulation of the conductor at a location a predetermined distance from the end thereof, means for gripping the conductor at a greater predetermined distance from the end thereof, cutter control means for operating said cutting means when the first section of said control member is advanced thereagainst and for maintaining said cutting means in its cutting position when the second section of said control member is advanced thereagainst, gripping control means for increasing the gripping force exerted on the conductor by said gripping means when the first section of said control member is advanced thereagainst, the force acting on said gripping means in a direction parallel to the axis of the conductor increasing as said gripping force increases, said gripping means being adapted to move the conductor gripped therein away from said cutting means before the first section of said control member loses contact with said gripping control means, means for driving said control member and means for restoring the control member, said cutting means and said gripping means to their initial positions after stripping.

4. In a machine for removing the insulation from the end of an electrical conductor, in combination, a control member having a tapered section, cutter follower means, gripper follower means, said gripper follower means and cutter follower means being disposed in tandem along the axis of said control member, means for longitudinally advancing the tapered section of said control member against said follower means, means for circumferentially cutting an end section of insulation on an electrical conductor when the tapered section of said control member advances and displaces said cutter follower means and for trapping said cut end section of insulation when said cutter follower means advances and loses contact with the tapered section of said control member, means for gripping the conductor with increasing pressure when the tapered section of said control member advances and displaces said gripper follower means, means for mounting said gripping means in movable relationship to said cutting means, the force exerted upon said gripping means in a direction parallel to the axis of the electrical conductor increasing with increase in the displacement of said gripper follower means until said gripping means and the conductor gripped therein moves away from said cutting means and the cut end section of insulation trapped thereby, means for reversing the direction of motion of said control member, after the cut end section of insulation has been removed and means for repositioning said cutting means and said gripping means as said control member is returned to its starting position.

5. A stripping machine as set forth in claim 4 in which said gripping means includes first and second gripping jaws and in which said gripper follower means includes a plurality of coacting follower members, said gripping jaws being adapted to travel inwardly toward the conductor to be gripped when said followers are driven outwardly by the advancing control member.

6. A stripping machine as set forth in claim 5 in which said gripping jaws include staggered segments to afford intermeshing and thereby reduce the area of the region between said gripping jaws as said gripping jaws travel toward one another.

7. A stripping machine as set forth in claim 4 in which said cutting means includes first and second cutter blades each having an edge of a shape and size suitable for use with the size of conductor being stripped, and in which said cutter follower means includes a plurality of coacting follower members, said cutter blades being adapted to travel inwardly upon the conductor to be stripped when said followers are driven outwardly by the advancing control member.

8. A stripping machine as set forth in claim 4 in which said mounting means includes first and second guide members, said guide members being disposed in a direction parallel to the axis of said control member to provide longitudinal movement of said gripping means with respect to said cutting means.

9. A stripping machine as set forth in claim 4 in which said gripping means includes first and second gripping jaws, said gripping jaws including staggered segments to afford intermeshing to reduce the area of the region between said gripping jaws as said gripping means grips said conductor with increasing pressure.

10. A stripping machine as set forth in claim 2 in which said gripping means includes first and second gripping jaws and in which said gripper follower means includes a plurality of coacting follower members, said gripping jaws being adapted to travel inwardly toward the conductor to be gripped when said followers are driven outwardly by the advancing control member.

11. In a cable stripping apparatus, in combination, a cutting mechanism including cutting members mounted for transverse movement toward one another to cut and trap an end section of insulation to be stripped from a conductor disposed between said cutting members and cam follower means arranged to close and open said cutting members when moved transversely relative to one another; a gripping mechanism including jaw members mounted for transverse movement toward one another to grip and hold the main body section of a conductor disposed between said jaws and cam follower means arranged to close and open said jaw members when moved transversely relative to one another; means for movably mounting said gripping mechanism to afford longitudinal movement thereof away from said cutting mechanism when said cutting members and jaw members are closed to draw said main body section of said conductor away from said trapped end section to remove said end section from the conductor, drive means for actuating said cam followers, said drive means including a section of varying cross-sectional dimension to progressively close said cutting and gripping mechanisms as it passes between said respective cam followers and a section of uniform dimension to hold said cutting members closed when disposed between the cam followers of said cutting mechanism, said jaw members being arranged to close upon said main body of the conductor when the cam followers thereof progress part way over the drive section of varying cross-sectional dimension whereby further transverse closing action of the jaw members is prevented and continued longitudinal movement of the drive section imparts longitudinal movement of the jaw members and the main section of the conductor away from the trapped section thereof to be stripped.

12. In a machine for stripping the insulation from the end of an electrical conductor, in combination, a cutting mechanism including a plurality of cutting members mounted for transverse movement with respect to a conductor disposed therebetween to cut and trap an end section of the insulation thereof, a plurality of cutter cam followers for controlling the inward and outward transverse movement of said cutting members, a plurality of crossmembers for connecting said cutter cam followers to said cutting members to move said cutting members inwardly in accordance with the outward transverse motion of said cutter cam followers, a gripping mechanism including a plurality of gripping members mounted for transverse movement with respect to a conductor disposed therebetween to grip and hold the main body section of the insulation thereof, a plurality of gripper cam followers for controlling the inward and outward transverse movement of said gripping members, a plurality of crossmembers for connecting said gripper cam followers to said gripping members to move said gripping members inwardly in accordance with the outward transverse motion of said gripper cam followers, means for mounting said gripping mechanism for longitudinal movement with respect to said cutting mechanism after said end section of insulation has been cut and trapped and said main body section of insulation has been gripped and held, cam control means having a driving section for imparting an outward transverse motion to said cam followers when said driving section is advanced therebetween and a dwell section for holding said cam followers a predetermined distance apart when said dwell section is advanced therebetween, said cutting mechanism being arranged to cut an end section of insulation on the conductor when the driving section of said cam control means is driven between said cutter cam followers and to trap the cut end section of insulation when the dwell section of said cam control means is driven between said cutter cam followers, said gripping mechanism being arranged to grip, hold and longitudinally displace the electrical conductor before said gripper cam followers come into contact with the dwell section of said cam control means.

* * * * *